United States Patent
Ahmed Salem et al.

(10) Patent No.: US 12,004,146 B2
(45) Date of Patent: Jun. 4, 2024

(54) DYNAMIC CHANNEL STATE INFORMATION REFERENCE SIGNALS (CSI-RS) RESOURCE MAPPING CONFIGURATION FOR PRECODED CHANNEL STATE INFORMATION REFERENCE SIGNALS (CSI-RS) CONFIGURATIONS

(71) Applicant: Nokia Technologies Oy, Espoo (FI)

(72) Inventors: Rana Ahmed Salem, Munich (DE); Eugene Visotsky, Buffalo Grove, IL (US); Salah Eddine Hajri, Antony (FR); Frederick Vook, Schaumburg, IL (US); Marco Maso, Issy les Moulineaux (FR); William Hillery, Lafayette, IN (US); Filippo Tosato, Bures sur Yvette (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 3 days.

(21) Appl. No.: 17/218,864

(22) Filed: Mar. 31, 2021

(65) Prior Publication Data

US 2021/0385828 A1    Dec. 9, 2021

Related U.S. Application Data

(60) Provisional application No. 63/034,600, filed on Jun. 4, 2020.

(51) Int. Cl.
*H04W 72/04*    (2023.01)
*H04B 7/06*    (2006.01)
(Continued)

(52) U.S. Cl.
CPC ...... *H04W 72/1263* (2013.01); *H04B 7/0626* (2013.01); *H04L 1/1614* (2013.01);
(Continued)

(58) Field of Classification Search
CPC ......... H04W 72/1263; H04W 72/1289; H04W 76/27; H04W 80/02; H04B 7/0626;
(Continued)

(56) References Cited

U.S. PATENT DOCUMENTS 10,020,860 B2    7/2018 Onggosanusi et al.
11,082,103 B2*   8/2021 Lee ...................... H04B 7/0456
(Continued)

FOREIGN PATENT DOCUMENTS

| CN | 107210801 A | 9/2017 |
| WO | 2018/097947 A2 | 5/2018 |
| WO | 2018/201284 A1 | 11/2018 |

OTHER PUBLICATIONS

International Search Report and Written Opinion received for corresponding Patent Cooperation Treaty Application No. PCT/EP2021/057371, dated Jun. 15, 2021, 13 pages.
(Continued)

*Primary Examiner* — Mahbubul Bar Chowdhury
(74) *Attorney, Agent, or Firm* — LIPPES MATHIAS LLP

(57) ABSTRACT

Dynamic and partial sharing of the channel measurement downlink reference signal resources are provided. An apparatus performs determining information relating to an actual number of ports configured for a user equipment for channel measurements and determining a pool of channel state information reference signal resources for the user equipment. The pool of channel state information reference signal resources is provided in a radio resource control configuration and includes an excess number of ports compared to the actual number of ports. The apparatus also transmits to the user equipment via at least one of a medium access control control element or downlink control information, configured user equipment specific mapping for the pool of channel state information reference signal resources.

11 Claims, 11 Drawing Sheets

(51) Int. Cl.
  H04L 1/1607 (2023.01)
  H04L 5/00 (2006.01)
  H04W 72/1263 (2023.01)
  H04W 72/23 (2023.01)
  H04W 76/27 (2018.01)
  H04W 80/02 (2009.01)
(52) U.S. Cl.
  CPC ........... *H04L 5/0051* (2013.01); *H04W 72/23* (2023.01); *H04W 76/27* (2018.02); *H04W 80/02* (2013.01)
(58) Field of Classification Search
  CPC ... H04B 7/0695; H04L 1/1614; H04L 5/0051; H04L 5/005; H04L 5/0053; H04L 5/0091; H04L 5/0094; H04L 5/0023
  See application file for complete search history.

(56) References Cited

U.S. PATENT DOCUMENTS

| | | | | |
|---|---|---|---|---|
| 11,632,209 | B2* | 4/2023 | Kwak | H04L 5/0048 370/329 |
| 2007/0249350 | A1* | 10/2007 | Jung | H04L 27/2647 455/436 |
| 2014/0286182 | A1* | 9/2014 | Chen | H04L 1/0026 370/252 |
| 2017/0195031 | A1* | 7/2017 | Onggosanusi | H04L 1/0026 |
| 2018/0054290 | A1 | 2/2018 | Park et al. | |
| 2018/0254812 | A1* | 9/2018 | Park | H04L 5/005 |
| 2018/0269939 | A1* | 9/2018 | Hu | H04B 7/0626 |
| 2018/0278314 | A1* | 9/2018 | Nam | H04W 72/23 |
| 2019/0123869 | A1* | 4/2019 | Kakishima | H04L 5/0048 |
| 2019/0273544 | A1* | 9/2019 | Cha | H04L 1/0026 |
| 2020/0382979 | A1* | 12/2020 | Song | H04L 5/0048 |
| 2020/0395990 | A1* | 12/2020 | Nam | H04W 72/23 |
| 2022/0029676 | A1* | 1/2022 | Ramireddy | H04B 7/0421 |

OTHER PUBLICATIONS

U.S. Appl. No. 62/986,206, "Improving Precoding", filed Mar. 6, 2020, 38 pages.
"3rd Generation Partnership Project; Technical Specification Group Radio Access Network; NR; Physical channels and modulation (Release 16)", 3GPP TS 38.211 V16.0.0, Dec. 2019, pp. 1-129.
"New WID: Further enhancements on MIMO for NR", 3GPP TSG RAN Meeting #86, RP-193133, Agenda: 9.1.1, Samsung, Dec. 9-12, 2019, 5 pages.
"CSI measurement enhancement for multi-TRP/panel transmission", 3GPP TSG RAN WG1 Meeting #96, R1-1903100, Agenda: 7.2.8.6, Huawei, Feb. 25-Mar. 1, 2019, 6 pages.
"3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.
Dahlman et al., "5G NR: The Next Generation Wireless Access Technology", Academic Press, Elsevier, 2018, 469 pages.
First Examination Report issued in corresponding Indian Patent Application No. 202247077074 dated Feb. 8, 2023.

* cited by examiner

```
NZP-CSI-RS-Resource ::= SEQUENCE {
    nzp-CSI-RS-ResourceId      NZP-CSI-RS-ResourceId,
    resourceMapping            CSI-RS-ResourceMapping,
    powerControlOffset         INTEGER (-8..15),
    powerControlOffsetSS       ENUMERATED{db-3, db0, db3, db6} OPTIONAL, - - Need R
    scramblingID ScramblingId,
    periodicityAndOffset       CSI-ResourcePeriodicityAndOffset OPTIONAL,
                               - - Cond  PeriodicOrSemiPersistent
    qcl-InfoPeriodicCSI-RS     TCI-StateId OPTIONAL, - - Cond Periodic
    ...
}

CSI-RS-ResourceMapping ::= SEQUENCE {
  frequencyDomainAllocation CHOICE {
     row1   BIT STRING (SIZE(4)),
     row2   BIT STRING (SIZE(12)),
     row4   BIT STRING (SIZE(3)),
     other  BIT STRING (SIZE(6))
  },
  nrofPorts               ENUMERATED {p1,p2,p4,p8,p12,p16,p24,p32},
  firstOFDMSymbolInTimeDomain      INTEGER (0..13),
  firstOFDMSymbolInTimeDomain2     INTEGER (2..12) OPTIONAL, - - Need R
  cdm-Type     ENUMERATED {noCDM, fd-CDM2, cdm4-FD2-TD2, cdm8-FD2-TD4},
  density CHOICE {
     dot5   ENUMERATED {evenPRBs, oddPRBs},
     one    NULL,
     three  NULL,
     spare  NULL
  },
  freqBand     CSI-FrequencyOccupation,
  ...
```

FIG. 1

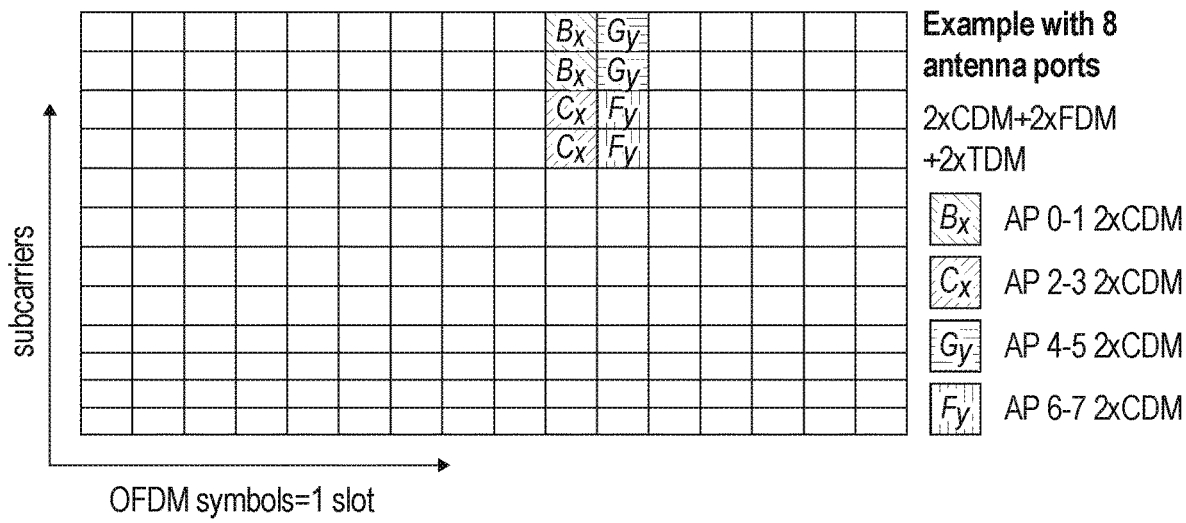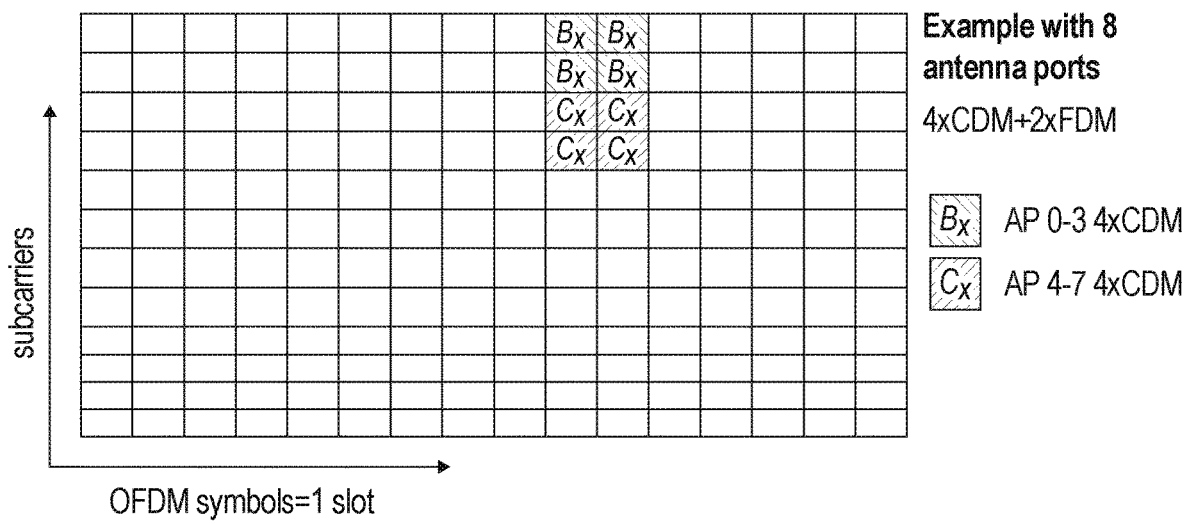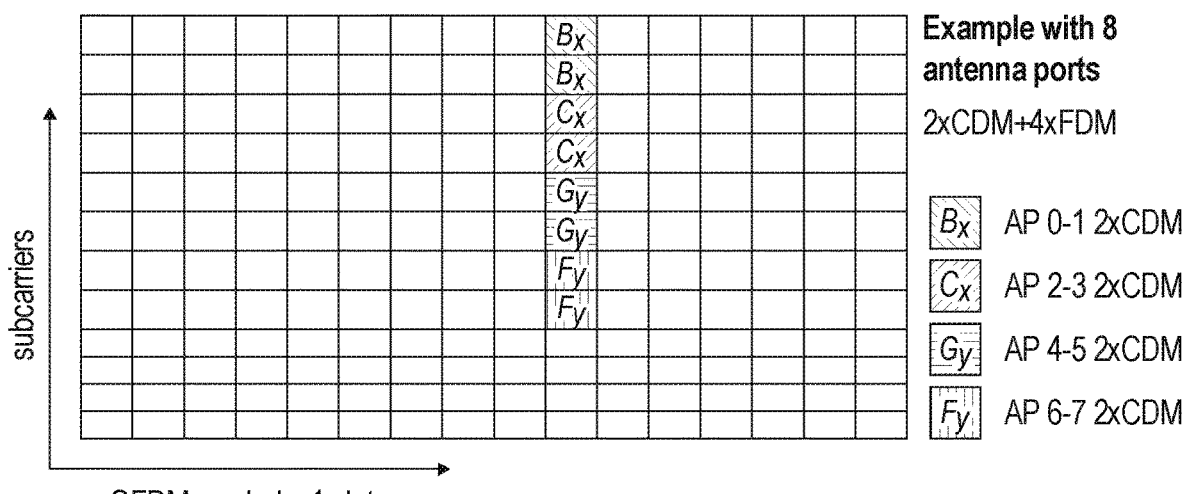
FIG. 3

```
ZP-CSI-RS-Resource ::=         SEQUENCE {
    zp-CSI-RS-ResourceId            ZP-CSI-RS-ResourceId,
    resourceMapping                 CSI-RS-ResourceMapping,
    periodicityAndOffset            CSI-ResourcePeriodicityAndOffset    OPTIONAL, -- Cond
PeriodicOrSemiPersistent
    ...
}

ZP-CSI-RS-ResourceId ::=        INTEGER (0..maxNrofZP-CSI-RS-Resources-1)
```

FIG. 4a

```
CSI-IM-Resource ::=            SEQUENCE {
    csi-IM-ResourceId              CSI-IM-ResourceId,
    csi-IM-ResourceElementPattern  CHOICE {
        pattern0                       SEQUENCE {
            subcarrierLocation-p0          ENUMERATED { s0, s2, s4, s6, s8, s10 },
            symbolLocation-p0              INTEGER (0..12)
        },
        pattern1                       SEQUENCE {
            subcarrierLocation-p1          ENUMERATED { s0, s4, s8 },
            symbolLocation-p1              INTEGER (0..13)
        }
    }                                                                                OPTIONAL, --
Need M
    freqBand                       CSI-FrequencyOccupation                           OPTIONAL, --
Need M
    periodicityAndOffset           CSI-ResourcePeriodicityAndOffset                  OPTIONAL, --
Cond PeriodicOrSemiPersistent
    ...
}
-- TAG-CSI-IM-RESOURCE-STOP
-- ASN1STOP
```

FIG. 4b

|  | AP1 | AP2 | AP3 | AP4 |
|---|---|---|---|---|
| UE1 | $b_1$ | $b_3$ | $b_4$ | $b_7$ |
| UE2 | $b_1$ | $b_2$ | $b_4$ | $b_6$ |
| UE3 | $b_2$ | $b_5$ | $b_6$ | $b_8$ |
| UE4 | $b_3$ | $b_9$ | $b_1$ | $b_{10}$ |

DYNAMIC CHANNEL STATE INFORMATION REFERENCE SIGNALS (CSI-RS) RESOURCE MAPPING CONFIGURATION FOR PRECODED CHANNEL STATE INFORMATION REFERENCE SIGNALS (CSI-RS) CONFIGURATIONS

RELATED APPLICATION

This application claims priority to U.S. Provisional Application No. 63/034,600, filed on Jun. 4, 2020, which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for dynamic and partial sharing of the channel measurement downlink (DL)-reference signal (RS) resources.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (UE) (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein:

FIG. 1 illustrates an example of NZP-CSI-RS-Resource and CSI-RS-ResourceMapping information elements (IEs);

FIG. 3 illustrates some examples of three possible configurations for CSI-RS resource mapping for eight antenna ports;

FIG. 4a illustrates an example of a ZP-CSI-RS-Resource information element;

FIG. 4b illustrates an example of a CSI-IM-Resource information element;

DETAILED DESCRIPTION

Figure 2:
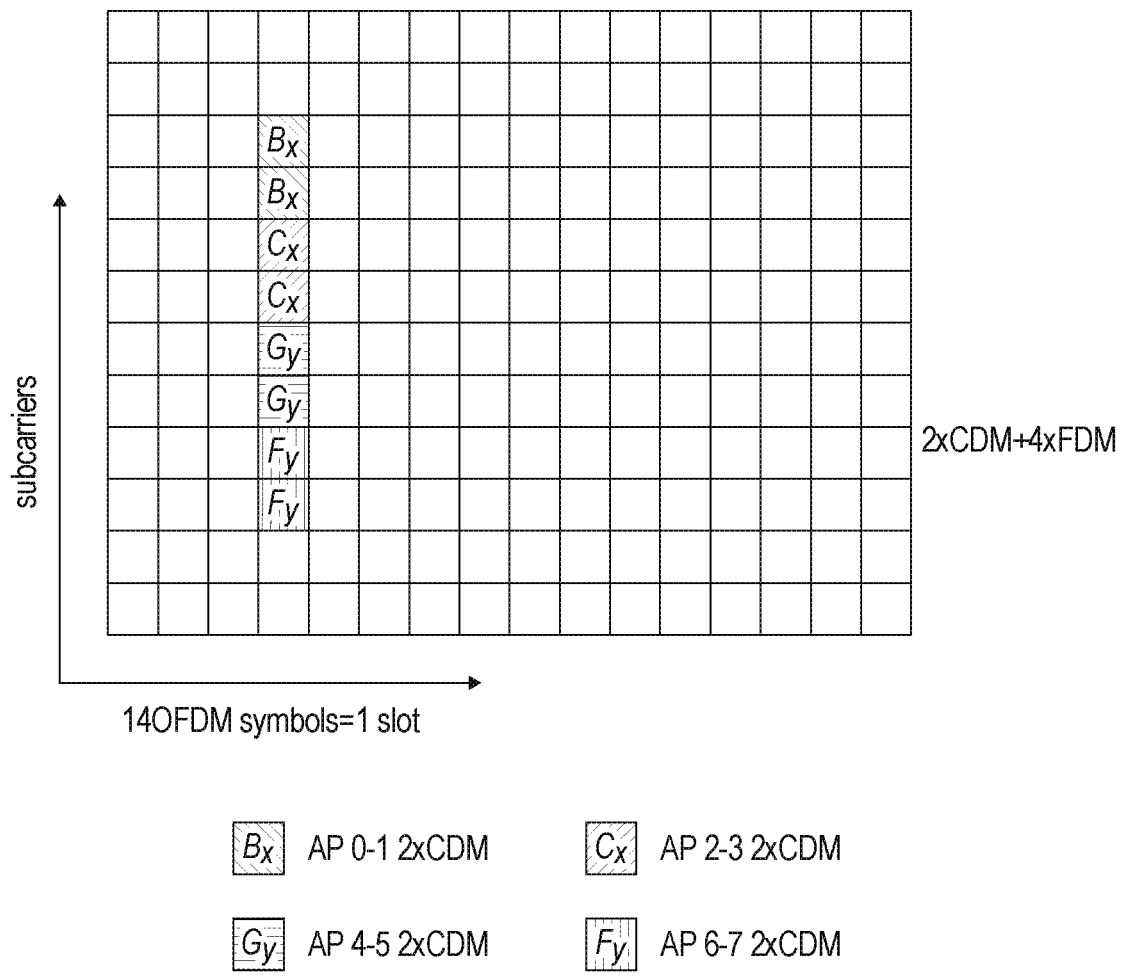
FIG. 2 illustrates one example resource mapping configuration.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for dynamic and partial sharing of the channel measurement downlink (DL)-reference signal (RS) resources, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

The expected significant gains of massive multiple-input multiple-output (MIMO) are at least partially conditioned on reliable channel state information (CSI) knowledge of the downlink (DL) channel at the network node (e.g., gNB) side. This is required in order to be able to design the proper DL precoder, perform scheduling, etc.

In frequency division duplex (FDD) 5G systems, the gNB obtains DL channel information from UE CSI reporting. The UE measures downlink reference signals (e.g., CSI-RS) transmitted by the gNB, and uses those measurements to compute downlink CSI and perform feedback according to the CSI reporting configuration. For precoding matrix indicator (PMI) reporting, 5G NR specified type I, type II, and port selection type II codebooks. 5G NR has also specified an enhanced type II.

In 5G, CSI-RS is configured per device, i.e., it is UE-specific. Nevertheless, the CSI-RS resources can be shared among many UEs. It is up to the network to optimize CSI-RS configurations. For example, for non-zero power (NZP)-CSI-RS, the resource mapping may be configured in radio resource configuration (RRC) using the NZP-CSI-RS-Resource and CSI-RS-ResourceMapping information elements (IEs), as illustrated in the example of FIG. 1.

Using at least the received information element (IE), CSI-RS-ResourceMapping, in RRC configuration, the UE is able to determine the CSI-RS resource mapping inside a physical resource block (PRB) to its antenna ports. As one example, a UE may be configured in RRC, for instance, with the following parameters:

density=one,nrofPorts=p8,cdm-Type=fd-CDM2, frequencyDomainAllocation.other=011110, firstOFDMSymbolinTimeDomain=3.

Given this RRC configuration, the following resource mapping configuration can be inferred: [(2,3), (4,3), (6,3), (8,3), (3,3), (5,3), (7,3), (9,3)], which in turn informs the UE of the mapping between its antenna ports and CSI-RS resource elements is as shown in FIG. 2, i.e., UE should look at these resources to measure DL CSI or interference. FIG. 2 illustrates one possible configuration for 8 antenna ports (APs).

With different configuration of CSI-RS-ResourceMapping, there are several options from which CSI-resource element patterns can be configured per UE. FIG. 3 illustrates some examples of possible configurations for CSI-RS resource mapping for 8 antenna ports.

It is noted that the same field: "CSI-RS-ResourceMapping' is also present in the RRC configuration of ZP CSI-RS, which is used for interference measurement from other cells or for indicating a set of resources on which the physical downlink shared channel (PDSCH) for a particular user are not transmitted. An example of a ZP-CSI-RS-Resource IE is illustrated in FIG. 4*a*.

A similar approach may also be applied on CSI-interference measurement (IM) reference signals that may be used for interference measurement. FIG. 4*b* illustrates an example of a CSI-IM-Resource IE, where the fields subcarrierLocation-p0, symbolLocation-p0, subcarrierLocation-p1 and symbolLocation-p1 can be updated in MAC-CE or DCI.

Certain example embodiments described herein may be applicable at least to NZP-CSI RS, CSI-IM and/or ZP-CSI-RS, as will be discussed in more detail below.

Spatially beamformed CSI-RS has been introduced, in what is known as class B CSI feedback. In NR, spatially beamformed CSI-RS resources are used in port selection type II codebook and enhanced port selection type II codebook.

In fact, spatially beamformed CSI-RS can also be applied in a transparent manner to the UE. For example, in case a gNB has acquired spatial information on the downlink (DL) channel of a particular UE from uplink (UL) sounding reference signals (SRS) sent from that UE, the gNB can decide on how to use this information to build long term beams used to create UE specific virtual antenna ports to that UE. In such a case, the gNB may beamform the CSI-RS using those weights.

Further CSI enhancements for NR are expected to be provided. For example, further enhancements on MIMO for NR may be provided, which may include specifying CSI reporting for DL multi-transmission reception point (TRP) and/or multi-panel transmission to enable more dynamic channel/interference hypotheses for non-coherent joint transmission (NCJT), targeting both frequency range 1 (FR1) and frequency range 2 (FR2). Additionally, if needed, Type II port selection codebook enhancement may be provided, (e.g., based on previous Type II port selection) where information related to angle(s) and delay(s) may be estimated at the gNB based on UL reference signals transmission by utilizing DL/UL reciprocity of angle and delay, and the remaining DL CSI may be reported by the UE, mainly targeting FDD FR1 to achieve a better trade-off between UE complexity, performance, and reporting overhead.

It is anticipated that the partial reciprocity is going to be exploited to enhance the port selection codebook on the delay domain, in addition to the spatial domain. Port selection codebook is already based on spatially beamformed CSI-RS.

As mentioned above, CSI-RS can be shared in practice to save DL resources among UEs in the same cell. However, in case the CSI-RS are beamformed (whether in space and/or delay domain), sharing CSI-RS resources (i.e., using the same resource elements) among UEs, in the same cell, may no longer be reasonable given the current semi-static configuration of channel measurement resources (provided via RRC). Indeed, the precoding of CSI-RS may change, for example, depending on UEs feedback or estimated wideband channel information from UE UL reference signal transmission. If shared CSI-RS resources are not changed accordingly, a UE would subsequently measure resources that do not convey meaningful information on its channel, i.e., precoded with spatial beams and frequency-domain (FD) components that are outside UE-specific channel supports. Additionally, an RRC-reconfiguration-based solution may be impractical, given the latency this process requires.

This has the consequence that a significant amount of DL resources may be needed, especially if CSI-RS is configured as periodic, since it should scale with the number of UEs and the number of estimated ports. With the eventual introduction of FD precoding to CSI-RS, even more UE-specific DL resources would be needed.

The problem may become severe with multi-TRP communication. With a UE connected to more than one TRP, the UE is expected to measure CSI and/or interference using the UE-specific SD/FD CSI-RS resources from all serving TRPs.

Figures 5, 6A:
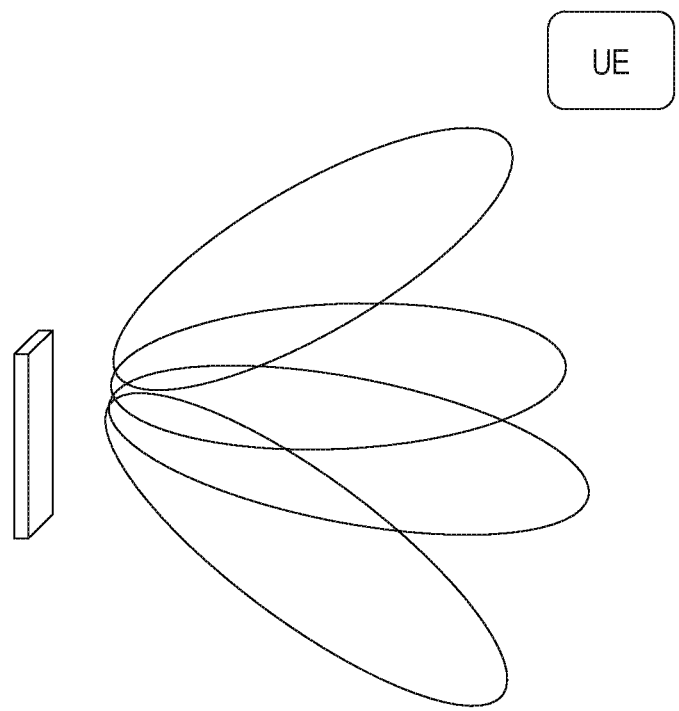
FIG. 5 illustrates the use of static beams to statically share CSI-RS resources, according to one example.
FIG. 6a illustrates a table depicting an example of four UEs partially sharing virtual antenna ports, according to one example embodiment.

One solution to the problem of increased DL overhead, as discussed above, is to divide the sector (cell) into several sub-sectors, e.g., using wide beams as shown in FIG. 5. As an example, FIG. 5 illustrates the use of static beams to statically share CSI-RS resources. This effectively divides the cell into several groups (4 in the example of FIG. 5) and all the UEs within one wide beam will have their UE specific beams altered to match that of the sub-sector. In other words, the CSI-RS resources are not UE-specific anymore, rather they are sub-sector specific. This can control the increase in DL overhead such that it does not scale with the number of UEs but will rather increase with the number of sub-sectors or groups. Another solution would be to increase the periodicity of the DL CSI-RS transmission. The CSI-RS resources can be configured, e.g., with periodicity of 4-640 slots.

An embodiment provides a method where the CSI-RS resources can be effectively and dynamically shared among UEs, even with UE-specific CSI-RS. Since the long term spatial and delay beamforming weights are often derived from a fixed codebook, this means that two UEs may have one or several common spatial beam and/or FD components, although their other components may differ. Please note that, as discussed herein, reference to CSI-RS resource sharing among UEs may mean that they are going to use the same resource elements in a PRB, hence DL overhead reduction can be achieved.

In an example hypothetical case where the two UEs choices of spatial beams and/or FD components overlap 100%, i.e., channel measurement CSI-RS resources will be precoded using the same weights, the gNB may configure both UEs with the same CSI-RS mapping and thus save CSI-RS overhead. However, this may be a rare scenario to occur, especially in FR1 with a non-line-of-sight (NLOS) case.

Another problem is that the choice of the spatial beams and/or FD components should be time varying, where it will change with the channel variation due to UE mobility and propagation environment evolution or with traffic variations (e.g., a new user enters the system or an existing user going into idle mode); whereas the CSI-RS mapping in current specifications is fairly static since it is provided to the UE in RRC configuration. Adopting an RRC reconfiguration-based solution may be impractical.

Indeed, RRC reconfiguration may include considerable delay that exceeds the channel stationarity time, i.e., time interval over which the channel support in space and delay domains is constant.

In certain scenarios, closely located UEs may partially share similar spatial beams and/or FD components. In such scenarios, enabling partial sharing of channel measurement CSI-RS resource elements would reduce DL overhead, resulting in performance gains.

According to an embodiment, a solution is provided to enable dynamic and partial sharing of the channel measurement CSI-RS resources (and consequently resource elements).

One embodiment may be directed to a method where, in RRC, a gNB may configure one or more UE(s) with a pool of CSI-RS resources that contains an excess of ports compared to the number of ports that will be used by the UE(s) for actual channel measurements. Optionally, the gNB may inform the UE of the actual number of ports. In an embodiment, the gNB may transmit to a UE via Medium access control-control element (MAC-CE)/Downlink control information (DCI), an updated or first time UE specific mapping for CSI-RS resources within the already RRC configured pool of resources, for example, using: bit-map, combinatorial indexing, and/or explicit configuration of indices. Certain embodiments may provide new dynamic signalling functionality, in MAC CE or DCI, for the gNB to inform a UE of updated UE or first time UE specific mapping for CSI-RS resources. In this case, MAC CE or DCI are used to select one of the possible mappings provided in RRC.

According to certain embodiments, the UE specific mapping for the CSI-RS resources may be indicated via at least one of: RRC containing a list of N possible CSI-RS resource mappings; in MAC-CE a subset of the N possible CSI-RS resource mappings are activated, e.g., $N_\alpha$; and in DCI gNB can indicate which of the $N_\alpha$ active resource mappings should be selected. Using MAC-CE to activate a subset of possible mappings and DCI to select one may lead to reducing the bit-width needed to convey the selection in DCI.

In some embodiments, the UE specific mapping can be performed over a group of resources instead of individual resources to reduce mapping overhead in DL. The size of the group of resources can be fixed in the specification or configured in RRC.

According to an embodiment, the UE specific mapping provided in RRC, activated in MAC-CE and selected in DCI may be performed over a group of resources instead of individual resources to reduce mapping overhead in DL. The size of the group of resources can be fixed in the specification or specified in RRC.

In one embodiment, the mapping may involve the UE specific ports on the $1^{st}$ polarization, since the mapping of the UE specific ports on the $2^{nd}$ polarization can be inferred from the mapping of the UE specific ports on the $1^{st}$ polarization. According to an embodiment, a default mapping may be provided in RRC configuration.

In some embodiments, a subset of the resources provided in RRC default mapping are updated. In other words, part of the mapping provided in RRC configuration may be kept constant and another part may be updated in MAC-CE and/or DCI. According to an embodiment, the different groups may be updated with different periodicities.

Another embodiment may be directed to a method where a gNB may configure a UE with a pool of resources, which may include the number of ports assigned to UE in RRC configuration. In an embodiment, the gNB may transmit to the UE in MAC-CE/DCI, one or two shift values: $k_{shift}$ and $l_{shift}$ by which the UE can learn that it should shift the existing resource mapping (configured in RRC) in frequency and/or time inside the PRB.

Certain embodiments may provide new dynamic signalling functionality, in MAC CE or DCI, to allow a gNB to inform UE of new shifted resource mapping by using shift values $k_{shift}$ and $l_{shift}$. In an embodiment, a new field may be added in RRC for nrofPortsUE. In some embodiments, a UE may be expected to update channel measurement resources, for a given CSI reporting setting, based on an indication from the gNB.

A utility of certain embodiments may be to enable exploiting partial UL/DL partial reciprocity. Indeed, any method using delay information in the CSI-RS precoding, in addition to spatial beamforming, may benefit from an increase in the CSI-RS overhead, if dynamic CSI-RS sharing is not enabled. This is due to the fact that the gNB would need to convey additional information on the spatial/delay domain supports, via the selected CSI-RS precoding.

Certain embodiments can also be of use, for example, for beam management purposes. Indeed, instead of reporting a CRI over the entire number of configured resources, an embodiment can be used as a means to restrict beam measurements to the dynamically indicated resources, making it possible to reduce the required field for beam indication in UCI. This can be of use, for instance, in high frequency ranges, where beam search is performed over a large number of narrow beams.

Figure 6B:
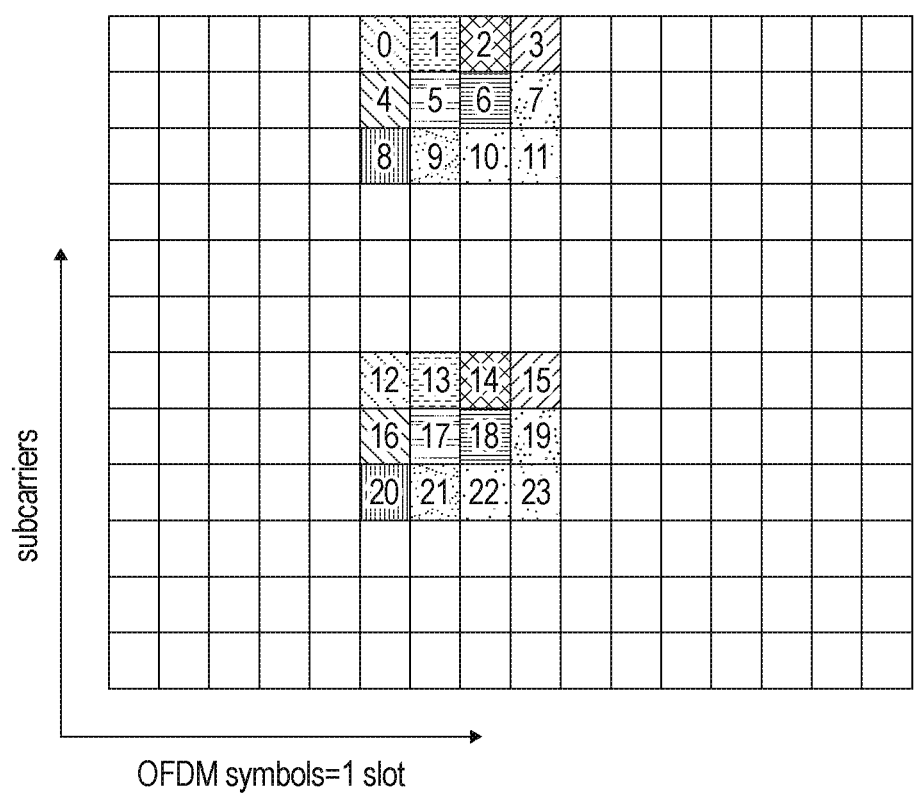
FIG. 6b illustrates an example showing four UEs sharing ten unique beams with UE specific mapping, according to one example embodiment.

FIG. 6a and FIG. 6b illustrate an example embodiment with 4 UEs, in which each UE selects 8 virtual antenna ports (spatial beams), with L=4 beams per polarization. It is noted that it is assumed that the same beam weights are used for both antenna polarizations at a given antenna element location, which is the common practice. The 4 beams selected by each UE are indicated in the table in FIG. 6a. It should also be noted that FIGS. 6a and 6b illustrate one example, since any number of UEs or beams may be included according to certain embodiments.

According to an embodiment, if the gNB transmits the DL CSI-RS signals as UE specific, the amount of DL overhead needed is $N_{users} \times 2L=32$ resource elements (32 being the maximum number of considered CSI-RS ports). In FIGS. 6a and 6b, an example of partially overlapping beam selection among UE is provided. As can be seen in this example, there is no complete intersection between the sets of selected beams by different UEs. Nevertheless, 10 unique beams were selected by the four UEs. This means that the gNB does not require 32 CSI-RS resource elements to convey the selected beams, 20 CSI resource elements will be sufficient for that (2 CSI-RS ports per cross-polarized beam).

In an embodiment, if the CSI-RS resources are for example configured as illustrated in FIG. 6b, the proposed UE-specific mapping indication enables to reduce the number of needed CSI-RS resource elements to just 20 when only 10 distinct beams are required. This represents a gain of 12 resource elements compared to configured UE-specific CSI-RS, where the gNB needs 32 resource elements to convey 4 beams for each of the 4 UEs. Again, it is noted that the configuration in FIG. 6b is just one example, and other configurations are possible according to certain embodiments as will be discussed below.

In this example, a case of spatially beamformed CSI-RS can be seen, however the DL overhead may increase with introduction of FD precoding and especially in case of multi-TRP operation. In multi-TRP operations, for a cooperating set of N TRPs, the UE may report CSI per interference hypothesis, i.e., $2^N-1$ interference hypotheses should be considered. This results in a considerable increase in CSI reporting configuration in RRC. Certain embodiments may be used to reduce any redundancy in the needed channel measurement and interference measurement resources configuration, as a pool of resources may be provided in RRC and CMR/IMR are dynamically specified via methods provided by certain embodiments.

To enable CSI-sharing among UEs in the same cell, example embodiments may provide several solutions. For example, one embodiment may be directed to dynamic UE-specific mapping as introduced above.

Figures 7A, 7B:
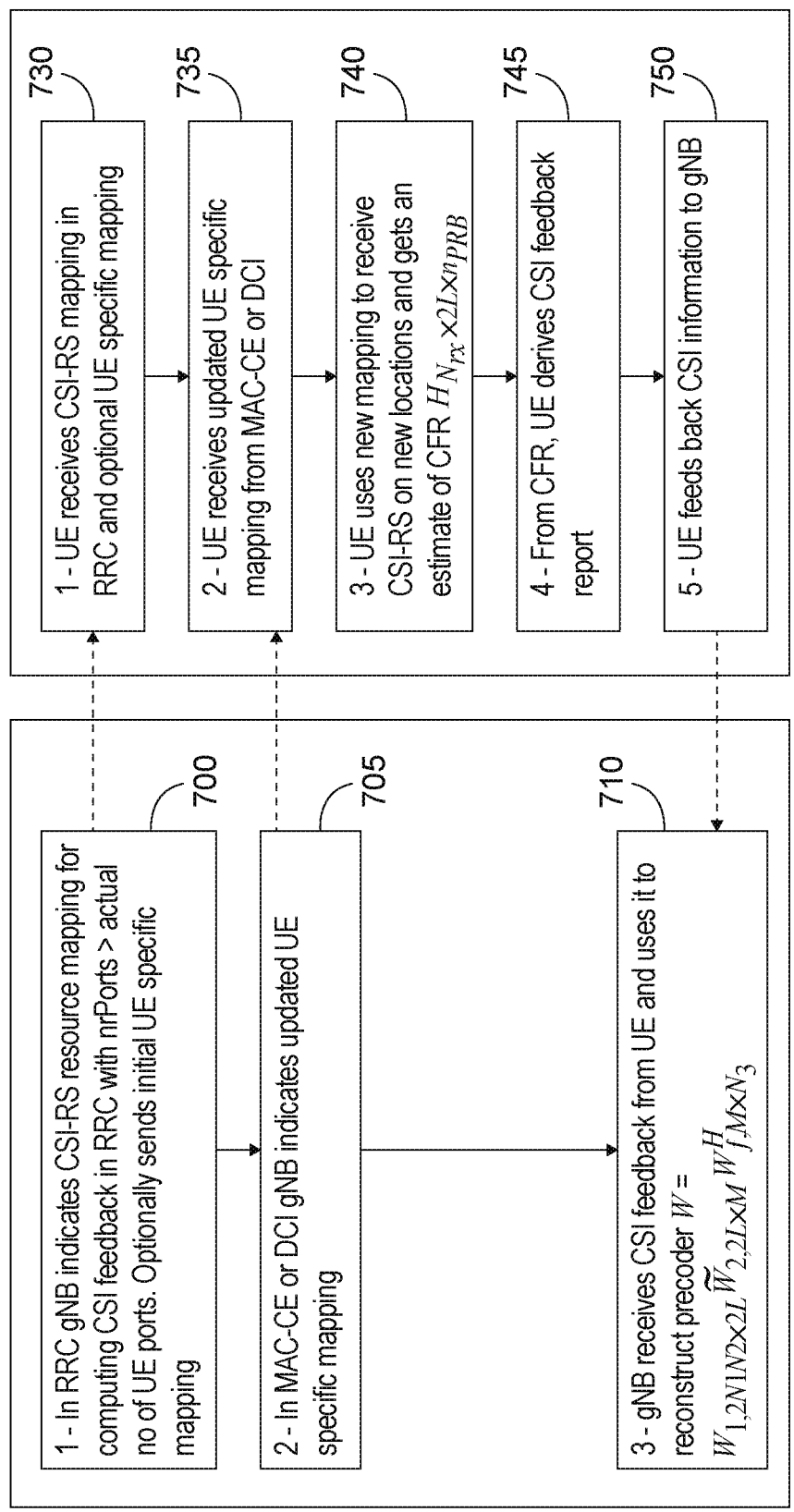
FIG. 7a illustrates an example flow diagram of a method, according to an embodiment.
FIG. 7b illustrates an example flow diagram of a method, according to an embodiment.

FIG. 7a illustrates an example flow diagram of a method for dynamic UE specific mapping, according to one example embodiment. In certain example embodiments, the flow diagram of FIG. 7a may be performed by a network entity or network node in a communication system, such as LTE or 5G NR. For instance, in some example embodiments, the network node performing the method of FIG. 7a may include a base station, access node, eNB, gNB, and/or NG-RAN node, or the like.

As illustrated in the example of FIG. 7a, the method may include, at 700, indicating to a UE, in RRC, CSI-RS resource mapping for computing CSI feedback in RRC with number of ports being greater than the actual number of ports the UE is configured to measure. Optionally, the indicating 700 may include sending initial UE specific mapping. The method may also include, at 705, indicating, in MAC-CE or DCI, updated UE specific mapping to the UE. As further illustrated in the example of FIG. 7a, the method may include, at 710, receiving CSI feedback from the UE and using it to reconstruct precoder, W.

FIG. 7b illustrates an example flow diagram of a method for dynamic UE specific mapping, according to another example embodiment. In certain example embodiments, the flow diagram of FIG. 7b may be performed by a network entity or network node in a communications system, such as LTE or 5G NR. For instance, in some example embodiments, the network entity performing the method of FIG. 7b may include a UE, mobile station, user device, IoT device, or the like.

In an embodiment, the method of FIG. 7b may include, at 730, receiving CSI-RS mapping in RRC and receiving optional UE specific mapping from a network node (e.g., gNB). At 735, the method may include receiving, from the network node, updated UE specific mapping from MAC-CE or DCI. As also illustrated in the example of FIG. 7b, the method may include, at 740, using the new mapping to receive CSI-RS on new locations and obtaining an estimate of channel frequency response (CFR). The method may also include, at 745, deriving CSI feedback report from the CFR. In an embodiment, the method of FIG. 7b may include, at 750, providing feedback CSI information to the network node.

It is noted that the periodicity of procedures 705, 710 at the gNB and procedures 735, 750 at the UE is much smaller than how often the RRC is transmitted in procedures 700, 730 at the gNB and UE, respectively. Hence, certain embodiments allow the resource mapping to be dynamically changed with channel and traffic variations.

FIG. 6b, as discussed above, illustrates an example application of a dynamic UE-specific mapping (e.g., as shown in the flow charts of FIGS. 7a and 7b), where the UE may be configured with a larger number of antenna ports than its actual number of virtual CSI ports. For example, UE4 in the example of FIG. 6b is RRC configured with nrofPorts=p24 instead of nrofPorts=p8 inside the IE CSI-RS-ResourceMapping. In an embodiment, a new field may also be added to differentiate between both values, e.g., nrofPorts=p24 and nrofPortsUE=p8.

Moreover, in an embodiment, a new signaling from gNB may be transmitted, where UE4 is configured via RRC (as default configuration), and/or MAC-CE and/or (downlink control information) DCI with a UE specific mapping, which guides the UE to identify its own 8 resources among the pool of 24 shared resources with other UEs. For example, the mapping in DL can be in the form of at least one of: (a) bit-map (e.g., 1100 0000 1100 1100 0000 1100), (b) explicit configuration of indices (e.g., [1 8 0 9 11 18 10 19]), or (c) combinatorial indexing.

While the options of sending a bit-map or combinatorial indexing may offer a smaller overhead, in some cases the explicit configuration of resources may be used in case it is important to retain the right order of the beams where this information is lost when using bit-map or combinatorial indexing. However, in some cases the order of the beams is arbitrary and gNB can change it as needed. For example, if the gNB determines that $b_3$ is replaced by $b_{11}$ for both UE1 and UE4 in FIG. 6a, the gNB can replace $b_3$ with $b_{11}$ in the CSI-RS without updating the UE specific mapping.

According to some embodiments, another way to convey the UE specific mapping in DL may include: (1) RRC contains a list of N possible CSI-RS resource mappings for a particular UE; (2) in MAC-CE a subset of the N possible CSI-RS resource mappings are activated, e.g., $N_\alpha$<N possible CSI-RS resource mappings are activated; and/or (3) in DCI, gNB can indicate which of the $N_\alpha$ active resource mappings should be selected.

As mentioned above, the way a beamformed CSI-RS is built may vary with channel changes and with changes in MU-MIMO grouping and, therefore, example embodiments are configured to dynamically update the UE specific mapping in MAC-CE or DCI to allow the gNB to dynamically configure the CSI resources in an event where a new UE arrives or a schedule change occurs etc. MAC-CE latency can be as small as 3 ms so it would be sufficient to track such changes, which are expected to happen every ~50 ms on average. It should be noted that this mechanism does not need to be tied to a specific CSI report periodicity. This may significantly reduce the actual number of dynamic configurations in practice. For instance, in case of aperiodic CSI-RS transmission and CSI report, the dynamic mapping information would not be regularly transmitted. In this case, transmitting a UE specific mapping in a capacity-limited framework such as DCI might still be feasible.

In some embodiments, the symmetry in the CSI-resource mapping among the 2 polarizations may also be exploited to reduce the overhead of the DL mapping. For example, the mapping can be used to guide the UE to the resources used on the $1^{st}$ polarization. From that information and by knowledge of the total number of pooled ports, the UE can deduce the mapping for the $2^{nd}$ polarization. For example, as shown in the example of FIG. 6b, UE 4 may send just the first part of the bitmap [1100 0000 1100] or in case of explicit configuration send just [1 8 0 9].

In certain embodiments, a part of the UE specific mapping is updated in MAC-CE or DCI, while the other part remains constant. For example, a default UE specific mapping is provided in RRC, and only a subset of the resources is updated in MAC-CE or DCI.

According to some embodiments, in order to reduce the overhead of the UE specific mapping, the UE specific mapping may be performed on a group of resources instead of individual resources. While this provides the gNB less flexibility on controlling the CSI-RS resource sharing among UEs, this will significantly reduce the mapping overhead in DL.

In some embodiments, different CSI-RS resource groups may be updated with different periodicities. This can be achieved, for example, when the update message inside MAC-CE or DCI contains the CSI-RS resource group index which needs to be updated. Or, if inside RRC configuration, different group of resources may be assigned different update periodicities.

Figure 8:
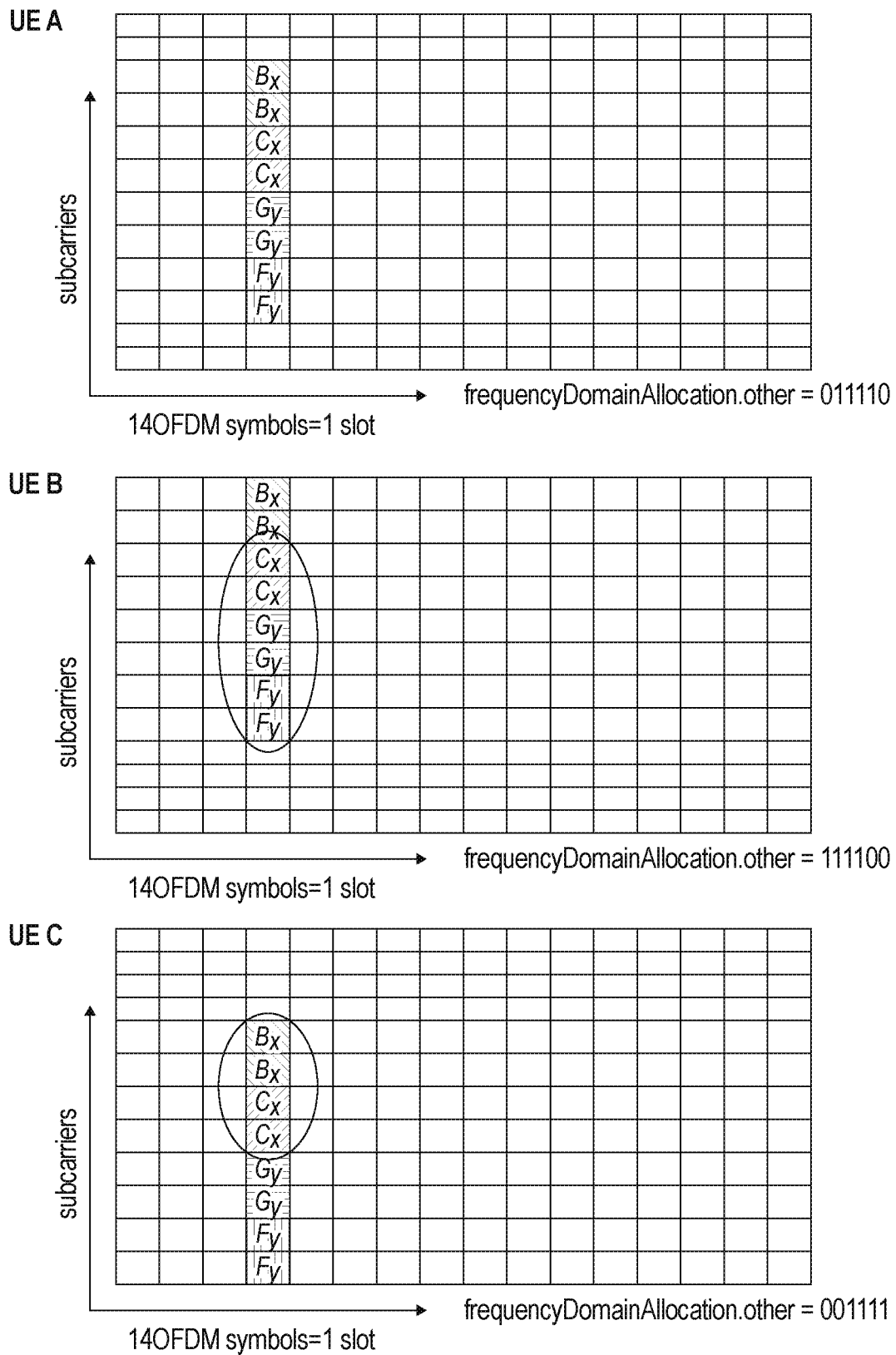
FIG. 8 illustrates an example of different configuration of frequencyDomainAllocation in RRC, according to one example embodiment.

A further embodiment may be directed to low DL overhead dynamic CSI-resource mapping shift. As mentioned above, using the field IE CSI-RS-ResourceMapping in RRC config, the UE is able to determine the exact CSI-RS resource mapping inside a physical resource block (PRB) to its antenna ports. In certain embodiments, by changing the fields of frequencyDomainAllocation and firstOFDMSymbolInTimeDomain, some degree of flexibility in the CSI-RS resource mapping can be achieved among a group of two or more UEs as illustrated in the example of FIG. 8. More specifically, the example of FIG. 8 illustrates some different configurations of frequencyDomainAllocation in RRC.

However, relying on RRC to allow the dynamic sharing among UEs may not be possible due to its semi-static nature which does not seem suitable to cope with the time varying channel, as mentioned above. Thus, some embodiments may be configured to send new fields in MAC-CE or DCI, to instruct the UEs to shift its existing configuration in frequency (subcarrier) and/or time domain (OFDM symbols) to allow some degree of CSI-resource sharing with other UEs. The new fields, for example referred to as $k_{shift}$ and $l_{shift}$, would instruct the UE to offset its whole resource configuration by $k_{shift}$ resources in frequency and $l_{shift}$ in time.

In practice, according to some embodiments, $k_{shift}$ and $l_{shift}$ can take values from −6 to 6 or −7 to 7 respectively. The values can also be drawn from a smaller set of choices to reduce the DL signalling overhead. This approach has at least the advantage of a smaller DL overhead that can, for example, make this type signalling easily fit in the capacity-limited DCI.

Figures 9A, 9B:
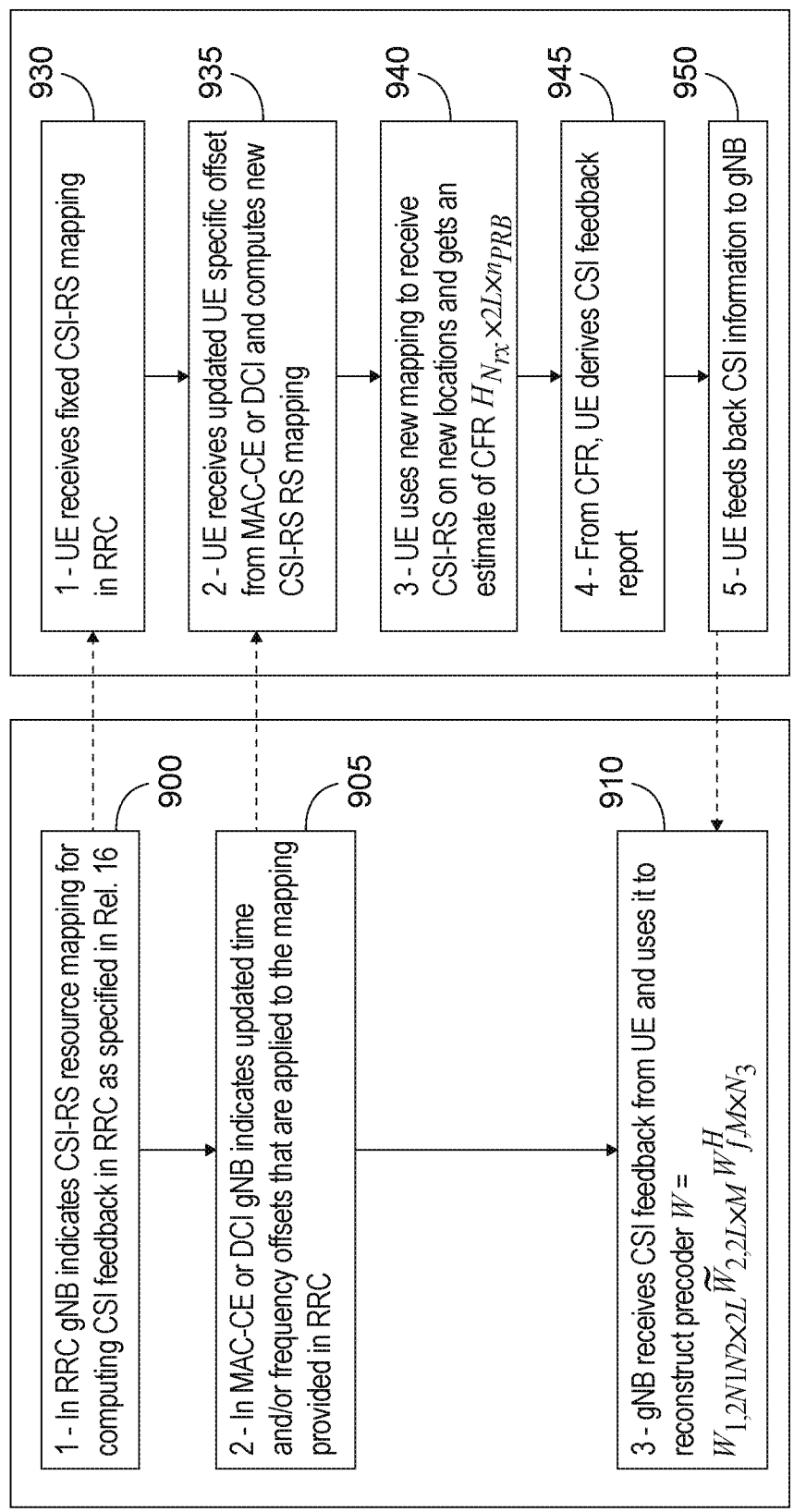
FIG. 9a illustrates an example flow diagram of a method, according to an embodiment.
FIG. 9b illustrates an example flow diagram of a method, according to an embodiment.

FIG. 9a illustrates an example flow diagram of a method for dynamic CSI-resource mapping shift, according to one example embodiment. In certain example embodiments, the flow diagram of FIG. 9a may be performed by a network entity or network node in a communication system, such as LTE or 5G NR. For instance, in some example embodiments, the network node performing the method of FIG. 9a may include a base station, access node, eNB, gNB, and/or NG-RAN node, or the like.

As illustrated in the example of FIG. 9a, the method may include, at 900, indicating to a UE, in RRC, CSI-RS resource mapping for computing CSI feedback in RRC. The method may also include, at 905, indicating, in MAC-CE or DCI, updated time and/or frequency offsets that are applied to the mapping provided in RRC. In some embodiments, the method may further include, at 910, receiving CSI feedback from UE and using the CSI feedback to reconstruct precoder, W.

FIG. 9b illustrates an example flow diagram of a method for dynamic CSI-resource mapping shift, according to another example embodiment. In certain example embodiments, the flow diagram of FIG. 9b may be performed by a network entity or network node in a communications system, such as LTE or 5G NR. For instance, in some example embodiments, the network entity performing the method of FIG. 9b may include a UE, mobile station, user device, IoT device, or the like.

In an embodiment, the method of FIG. 9b may include, at 930, receiving fixed CSI-RS mapping in RRC, from a network node (e.g., gNB). The method may also include, at 935, receiving, from the network node, updated UE specific offset from MAC-CE or DCI and computing new CSI-RS mapping. As also illustrated in the example of FIG. 9b, the method may include, at 940, using the new mapping to receive CSI-RS on new locations and obtaining an estimate of CFR. The method may also include, at 945, deriving CSI feedback report from the CFR. In an embodiment, the method of FIG. 9b may then include, at 950, providing feedback CSI information to the network node.

Figure 10A:
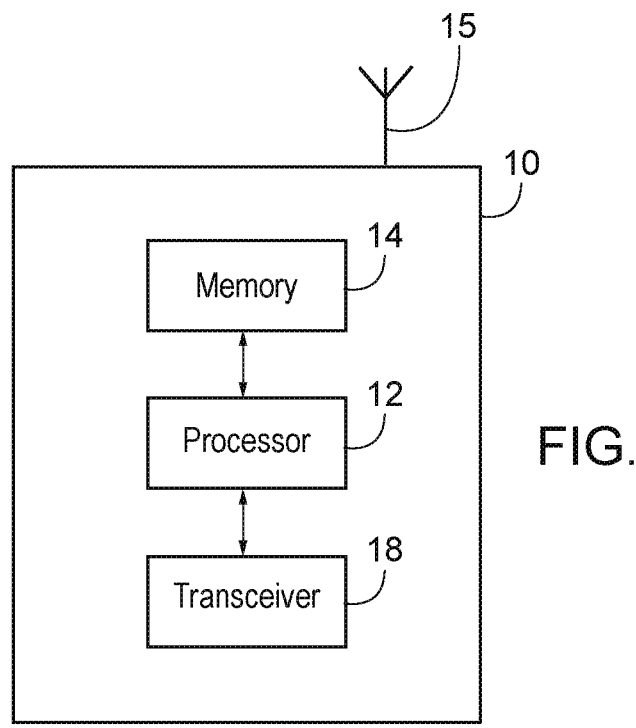
FIG. 10a illustrates an example block diagram of an apparatus, according to an embodiment.

FIG. 10a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), high altitude platform station (HAPS), integrated access and backhaul (IAB) node, and/or WLAN access point, associated with a radio access network, such as a LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 10*a*.

As illustrated in the example of FIG. 10*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 10*a*, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and/or receive information. The transceiver 18 may include, for example, a plurality of radio interfaces that may be coupled to the antenna(s) 15, or may include any other appropriate transceiving means. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (e.g., digital-to-analog converters and the like), mappers, a Fast Fourier Transform (FFT) module, and/or the like, e.g., to generate symbols or signals for transmission via one or more downlinks and to receive symbols (e.g., via an uplink).

As such, transceiver 18 may be configured to modulate information on to a carrier waveform for transmission by the antenna(s) 15 and to demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input device and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, HAPS, IAB node, WLAN access point, or the like. For example, in some embodiments, apparatus 10 may be configured to perform one or more of the processes depicted in any of the flow charts or signaling diagrams described herein, such as those illustrated in FIG. 7a, 7b, 9a, or 9b. In some embodiments, as discussed herein, apparatus 10 may be configured to perform a procedure relating to coordinated UL power control.

According to this embodiment, apparatus 10 may be controlled by memory 14 and processor 12 to indicate to a UE, in RRC, CSI-RS resource mapping for computing CSI feedback in RRC with number of ports being greater than the actual number of ports the UE is configured to measure. Optionally, apparatus 10 may be controlled by memory 14 and processor 12 to transmit initial UE specific mapping. In an embodiment, apparatus 10 may be controlled by memory 14 and processor 12 to indicate, in MAC-CE or DCI, updated UE specific mapping to the UE. According to certain embodiments, apparatus 10 may be controlled by memory 14 and processor 12 to receive CSI feedback from the UE and use the CSI feedback to reconstruct precoder, W.

According to a further embodiment, apparatus 10 may be controlled by memory 14 and processor 12 to indicate to a UE, in RRC, CSI-RS resource mapping for computing CSI feedback in RRC. In an embodiment, apparatus 10 may be controlled by memory 14 and processor 12 to indicate, in MAC-CE or DCI, updated time and/or frequency offsets that are applied to the mapping provided in RRC. In some embodiments, apparatus 10 may be controlled by memory 14 and processor 12 to receive CSI feedback from UE and using the CSI feedback to reconstruct precoder, W.

Figure 10B:
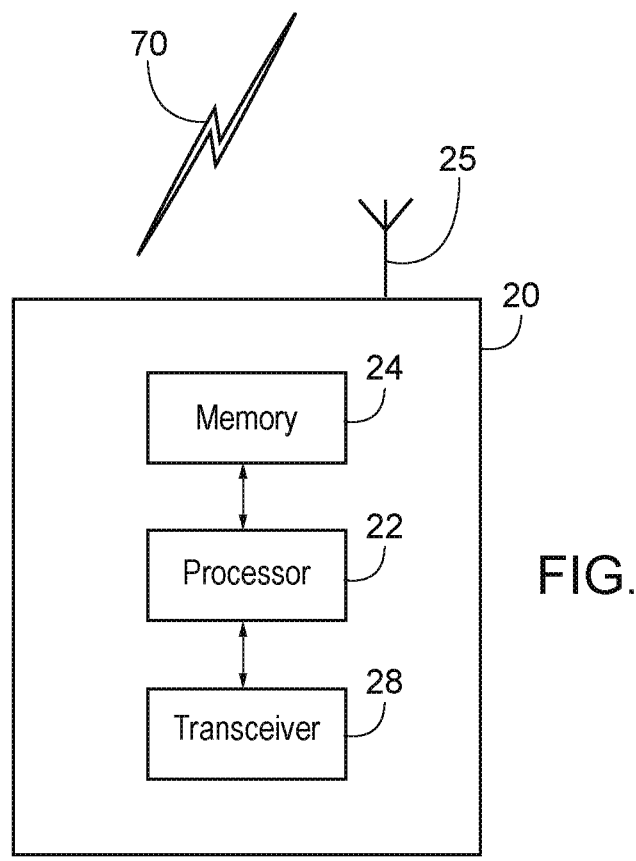
FIG. 10b illustrates an example block diagram of an apparatus, according to an embodiment.

FIG. 10b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 10b.

As illustrated in the example of FIG. 10b, apparatus 20 may include or be coupled to a processor 22 (or processing means) for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 10b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media, or other storage means. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 (or transceiving means) configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device) or input/output means. In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 7a, 7b, 9a or 9b. In certain embodiments, apparatus 20 may be configured to perform a procedure relating to real-time coordinated UL power control, for instance.

For example, in some embodiments, apparatus 20 may be controlled by memory 24 and processor 22 to receive CSI-RS mapping in RRC and receiving optional UE specific mapping from a network node (e.g., gNB). In an embodiment, apparatus 20 may be controlled by memory 24 and processor 22 to receive, from the network node, updated UE specific mapping from MAC-CE or DCI. According to an embodiment, apparatus 20 may be controlled by memory 24 and processor 22 to use the new mapping to receive CSI-RS on new locations and obtain an estimate of CFR. In one embodiment, apparatus 20 may be controlled by memory 24 and processor 22 to derive CSI feedback report from the CFR, and to provide CSI feedback information to the network node.

In another embodiment, apparatus 20 may be controlled by memory 24 and processor 22 to receive fixed CSI-RS mapping in RRC, from a network node (e.g., gNB). According to an embodiment, apparatus 20 may be controlled by memory 24 and processor 22 to receive, from the network node, updated UE specific offset from MAC-CE or DCI and computing new CSI-RS mapping. In certain embodiments, apparatus 20 may be controlled by memory 24 and processor 22 to use the new mapping to receive CSI-RS on new locations and to obtain an estimate of CFR. According to an embodiment, apparatus 20 may be controlled by memory 24 and processor 22 to derive CSI feedback report from the CFR, and to provide feedback CSI information to the network node.

Therefore, certain example embodiments provide several technological improvements, enhancements, and/or advantages over existing technological processes and constitute an improvement at least to the technological field of wireless network control and management. As discussed in detail above, certain embodiments provide systems and methods that enable dynamic and partial sharing of the channel measurement CSI-RS resources (and consequently resource elements). As a result of example embodiments, the CSI-RS resources can be effectively and dynamically shared among UEs. In addition, certain embodiments are able to reduce DL overhead resulting in performance gains. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

An embodiment may be directed to a method that includes determining or receiving, at a network node, information relating to an actual number of ports configured for a user equipment for channel measurements. The method may also include determining a pool of CSI-RS resources for the user equipment. The pool of CSI-RS resources may be provided in a RRC configuration and may include an excess number of ports compared to the actual number of ports. The method may then include transmitting, to the user equipment via at least one of MAC-CE or DCI, the configured user equipment-specific mapping for the pool of CSI-RS resources.

Another embodiment may be directed to an apparatus including at least one processor and at least one memory comprising computer program code. The at least one memory and computer program code configured, with the at least one processor, to cause the apparatus at least to determine or receive information relating to an actual number of ports configured for a user equipment for channel measurements, and to determine a pool of CSI-RS resources for the user equipment. The pool of CSI-RS resources may be provided in a RRC configuration and may include an excess number of ports compared to the actual number of ports. The at least one memory and computer program code may be further configured, with the at least one processor, to cause the apparatus at least to transmit, to the user equipment via at least one of MAC-CE or DCI, the configured user equipment-specific mapping for the pool of CSI-RS resources.

Another embodiment is directed to an apparatus that may include means for determining or receiving information relating to an actual number of ports configured for a user equipment for channel measurements. The apparatus may also include means for determining a pool of CSI-RS resources for the user equipment. The pool of CSI-RS resources may be provided in a RRC configuration and may include an excess number of ports compared to the actual number of ports. The apparatus may also include means for transmitting, to the user equipment via at least one of MAC-CE or DCI, the configured user equipment-specific mapping for the pool of CSI-RS resources.

Another embodiment is directed to a method that may include determining or receiving, at a network node, information relating to an actual number of ports configured for a user equipment for channel measurements. The method may also include determining a pool of CSI-RS resources for the user equipment. The pool of CSI-RS resources is provided in a RRC configuration and includes the actual number of ports. The method may include transmitting, to the user equipment via at least one of MAC-CE or DCI, one or two shift values by which the user equipment learns that the user equipment should shift an existing resource mapping in frequency and/or time inside the PRB.

Another embodiment is directed to an apparatus that may include at least one processor and at least one memory comprising computer program code. The at least one memory and computer program code configured, with the at least one processor, to cause the apparatus at least to determine or receive information relating to an actual number of ports configured for a user equipment for channel measurements, and to determine a pool of CSI-RS resources for the user equipment. The pool of CSI-RS resources is provided in a RRC configuration and includes the actual number of ports. The at least one memory and computer program code configured, with the at least one processor, to cause the apparatus at least to transmit, to the user equipment via at least one of MAC-CE or DCI, one or two shift values by which the user equipment learns that the user equipment should shift an existing resource mapping in frequency and/or time inside the PRB.

Another embodiment is directed to an apparatus that may include means for determining or receiving information relating to an actual number of ports configured for a user equipment for channel measurements. The apparatus may also include means for determining a pool of CSI-RS resources for the user equipment. The pool of CSI-RS resources is provided in a RRC configuration and includes the actual number of ports. The apparatus may include means for transmitting, to the user equipment via at least one of MAC-CE or DCI, one or two shift values by which the user equipment learns that the user equipment should shift an existing resource mapping in frequency and/or time inside the PRB.

Another embodiment is directed to a method that may include receiving, at a user equipment, CSI-RS mapping in RRC and optionally receiving user equipment specific mapping from a network node. The method may also include receiving, from the network node, updated user equipment specific mapping from MAC-CE or DCI. The method may then include using the updated user equipment specific mapping to receive CSI-RS on new locations and obtaining an estimate of CFR, deriving CSI feedback report from the CFR, and providing the CSI feedback information to the network node.

Another embodiment is directed to an apparatus that may include at least one processor and at least one memory comprising computer program code. The at least one memory and computer program code configured, with the at least one processor, to cause the apparatus at least to receive CSI-RS mapping in RRC and optionally receiving user equipment specific mapping from a network node, to receive updated user equipment specific mapping from MAC-CE or DCI, to use the updated user equipment specific mapping to receive CSI-RS on new locations and obtaining an estimate of CFR, to derive CSI feedback report from the CFR, and to provide the CSI feedback information to the network node.

Another embodiment is directed to an apparatus that may include means for receiving CSI-RS mapping in RRC and optionally receiving user equipment specific mapping from a network node. The apparatus may also include means for receiving, from the network node, updated user equipment specific mapping from MAC-CE or DCI. The apparatus may also include means for using the updated user equipment specific mapping to receive CSI-RS on new locations and obtaining an estimate of CFR, means for deriving CSI feedback report from the CFR, and means for providing the CSI feedback information to the network node.

Another embodiment is directed to a method that may include receiving, from a network node, fixed CSI-RS mapping in radio resource control (RRC), and receiving, from the network node, updated user equipment specific offset from MAC-CE or DCI and computing new CSI-RS mapping. The method may also include using the new CSI-RS mapping to receive CSI-RS on new locations and obtaining an estimate of CFR, deriving CSI feedback report from the CFR, and providing CSI feedback information to the network node.

Another embodiment is directed to an apparatus that may include at least one processor and at least one memory comprising computer program code. The at least one memory and computer program code may be configured, with the at least one processor, to cause the apparatus at least to receive, from a network node, fixed CSI-RS mapping in radio resource control (RRC), and receive, from the network node, updated user equipment specific offset from MAC-CE or DCI and computing new CSI-RS mapping. The at least one memory and computer program code may be further configured, with the at least one processor, to cause the apparatus at least to use the new CSI-RS mapping to receive CSI-RS on new locations and obtaining an estimate of CFR, derive CSI feedback report from the CFR, and provide CSI feedback information to the network node.

Another embodiment is directed to an apparatus that may include means for receiving, from a network node, fixed CSI-RS mapping in radio resource control (RRC), and means for receiving, from the network node, updated user equipment specific offset from MAC-CE or DCI and computing new CSI-RS mapping. The apparatus may also include means for using the new CSI-RS mapping to receive CSI-RS on new locations and obtaining an estimate of CFR, means for deriving CSI feedback report from the CFR, and means for providing CSI feedback information to the network node.

We claim:

1. A method, comprising:
   determining, at a network node, information relating to an actual number of ports configured for a user equipment for channel measurements;
   determining a pool of channel state information reference signal (CSI-RS) resources for the user equipment, wherein the pool of channel state information reference signal (CSI-RS) resources is provided in a radio resource control (RRC) configuration and includes an excess number of ports compared to the actual number of ports; and
   transmitting to the user equipment an RRC configuration comprising a list of a plurality of N possible CSI-RS resource mappings, a medium access (MAC) control element (CE) comprising a plural subset $N_\alpha$ of the plurality of N possible CSI-RS resource mappings that are activated, and downlink control information (DCI) comprising an indication of which of the plural subset $N_\alpha$ of active resource mappings is to be selected as configured user equipment specific mapping for the pool of channel state information reference signal (CSI-RS) resources, wherein the user equipment specific mapping is performed over different sub-groups of CSI-RS resources and the different sub-groups of CSI-RS resources are updated at different times.

2. The method according to claim 1, wherein the transmitting comprises transmitting the updated or first time user equipment specific mapping using at least one of:
   a bit-map;
   combinatorial indexing; or
   explicit configuration of indices.

3. The method according to claim 1, further comprising informing the user equipment of the actual number of ports.

4. The method according to claim 1, wherein the user equipment specific mapping is provided in the RRC configuration, activated in the MAC CE and selected in the DCI, and wherein the sizes of the sub-groups of resources are predefined.

5. The method according to claim 1, wherein the user equipment specific mapping corresponds to user equipment specific ports on one polarization.

6. The method according to claim 1, wherein the user equipment specific mapping is determined based on a default mapping provided in the RRC configuration.

7. A method, comprising:
   determining, at a network node, information relating to an actual number of ports configured for a user equipment for channel measurements;
   determining a pool of channel state information reference signal (CSI-RS) resources for the user equipment, wherein the pool of channel state information reference signal (CSI-RS) resources is provided in a radio resource control (RRC) configuration and includes the actual number of ports; and
   transmitting, to the user equipment, an RRC configuration comprising a list of a plurality of N possible CSI-RS resource mappings, a medium access (MAC) control element (CE) comprising a plural subset $N_\alpha$ of the plurality of N possible CSI-RS resource mappings that are activated, and downlink control information (DCI) comprising an indication of which of the plural subset $N_\alpha$ of active resource mappings is to be selected as an existing resource mapping, and transmitting one or two shift values by which the user equipment learns that the user equipment should shift the existing resource mapping in frequency and/or time inside the physical resource block (PRB), wherein the resource mapping is performed over different sub-groups of CSI-RS resources and the different sub-groups of CSI-RS resources are updated at different times.

8. The method according to claim 7, wherein the transmitting comprises transmitting the updated or first time user equipment specific mapping using at least one of:
   a bit-map;
   combinatorial indexing; or
   explicit configuration of indices.

9. The method according to claim 7, wherein the user equipment specific mapping is provided in the RRC configuration, activated in the MAC CE and selected in the DCI, and wherein the sizes of the sub-groups of resources are predefined.

10. The method according to claim 7, wherein the user equipment specific mapping corresponds to user equipment specific ports on one polarization.

11. A method, comprising:
    receiving, from a network node, fixed channel state information reference signal (CSI-RS) mapping in radio resource control (RRC), wherein the radio resource control (RRC) comprises a list of a plurality of N possible CSI-RS resource mappings;
    receiving, from the network node, a medium access (MAC) control element (CE) comprising a plural subset $N_\alpha$ of the plurality of N possible CSI-RS resource mappings that are activated, downlink control information (DCI) comprising an indication of which of the plural subset $N_\alpha$ of active resource mappings is to be selected as a first channel state information reference signal (CSI-RS) mapping, and updated user equipment specific offset from the medium access control (MAC)- control element (CE) or the downlink control information (DCI) and computing new channel state information reference signal (CSI-RS) mapping, wherein the new channel state information reference signal (CSI-RS) mapping is performed over different sub-groups of CSI-RS resources and the different sub- groups of CSI-RS resources are updated at different times;

using the new channel state information reference signal (CSI-RS) mapping to receive channel state information reference signal (CSI-RS) on new locations and obtaining an estimate of channel frequency response (CFR);

deriving channel state information (CSI) feedback report from the CFR; and providing CSI feedback information to the network node.

* * * * *